US005137119A

United States Patent [19]

Horbruegger et al.

[11] Patent Number: 5,137,119

[45] Date of Patent: Aug. 11, 1992

[54] ADAPTIVE DIGITAL ARMATURE CURRENT CONTROL METHOD FOR WARD-LEONARD ELEVATOR DRIVES USING AN SCR GENERATOR FIELD CONVERTER

[75] Inventors: Herbert K. Horbruegger; Mustapha Toutaoui, both of Berlin, Fed. Rep. of Germany

[73] Assignee: Otis Elevator Company, Farmington, Conn.

[21] Appl. No.: 589,859

[22] Filed: Sep. 28, 1990

[51] Int. Cl.[5] .......................... B66B 1/06; G05B 13/02

[52] U.S. Cl. .................................... 187/112; 318/158; 318/504; 318/561; 318/600

[58] Field of Search ............... 318/494, 503, 504, 505, 318/506, 507, 430, 432, 140, 141, 144, 146, 147, 158, 560, 561, 600, 609, 610, 590, 628, 682; 187/100, 112, 116, 119, 120; 388/809; 363/81, 84, 86, 87, 88, 90

[56] References Cited

U.S. PATENT DOCUMENTS

| | | | |
|---|---|---|---|
| 4,031,439 | 6/1977 | Sakai et al. | 318/338 |
| 4,201,936 | 5/1980 | Roumanis | 318/541 |
| 4,263,988 | 4/1981 | Inaba et al. | 318/148 X |
| 4,373,610 | 2/1983 | Ishii | 187/29 R |
| 4,507,723 | 3/1985 | Brackman, Jr. et al. | 363/87 |
| 4,649,328 | 3/1987 | Leonard et al. | 318/317 |
| 4,716,348 | 12/1987 | Nolan et al. | 318/479 |
| 4,739,234 | 4/1988 | Nolan et al. | 318/504 |
| 4,804,895 | 2/1989 | Miskin | 318/317 X |
| 4,982,145 | 1/1991 | Peterson | 318/594 |
| 4,999,556 | 3/1991 | Masters | 318/599 |

OTHER PUBLICATIONS

A Microprocessor-Controlled Fast-Response Speed Regulator with Dual Mode Current Loop for DCM Drives, Ohmae et al, IEEE Transactions, vol 1A-16 No. 3, May/Jun. 1980.

A Fast-Response Current Controller for Microprocessor-based SCR-DC Motor Drives, Collings & Wilson, 1988 IEEE.

Four-Quadrant DC Variable-Speed Drives—Design Considerations Joos & Barton, Proceedings of the IEEE, vol. 63, No. 12, Dec. 1975.

*Primary Examiner*—Bentsu Ro
*Attorney, Agent, or Firm*—Breffni X. Baggot

[57] ABSTRACT

A current regulator phase controls a power signal to control silicon controlled rectifiers arranged in a bridge. The silicon controlled rectifiers excite a generator field of an elevator drive. Discontinuity in the generator field current, caused by the inductive load and latching and holding currents in the silicon controlled rectifiers, is detected to provide an analog discontinuity signal. The analog discontinuity signal is converted to digital form and used to dynamically alter the gain and response of the regulator.

8 Claims, 7 Drawing Sheets

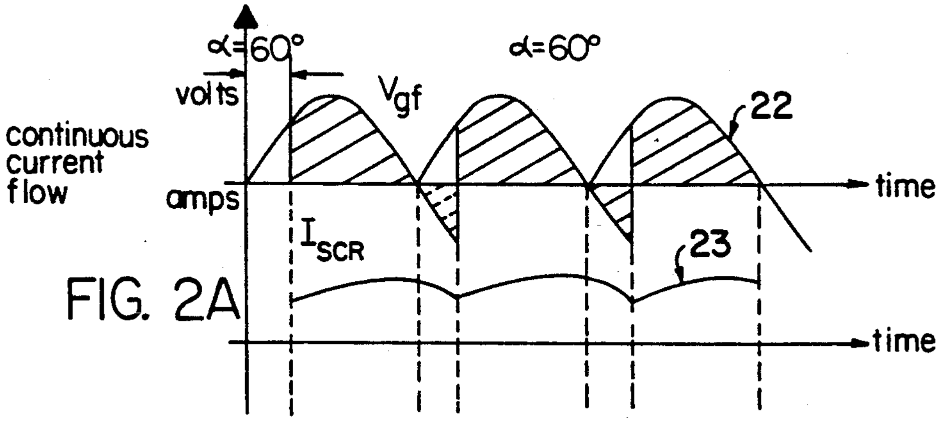
FIG. 2A
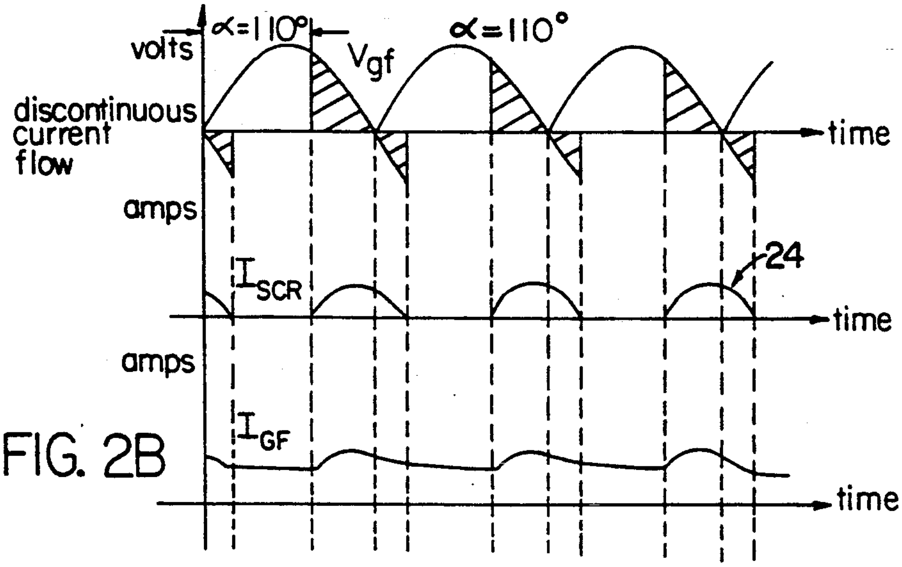
FIG. 2B
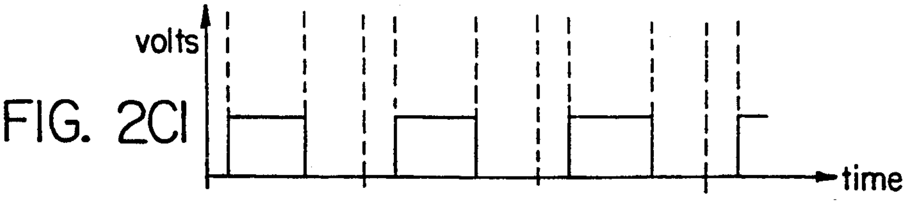
FIG. 2C1
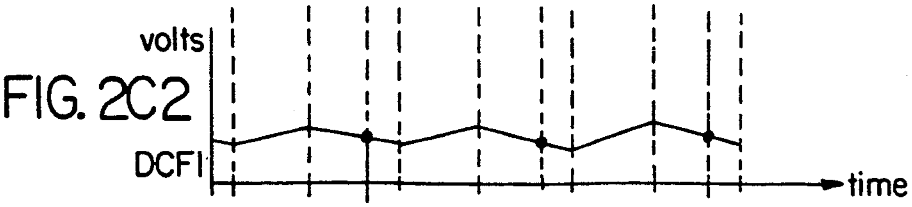
FIG. 2C2
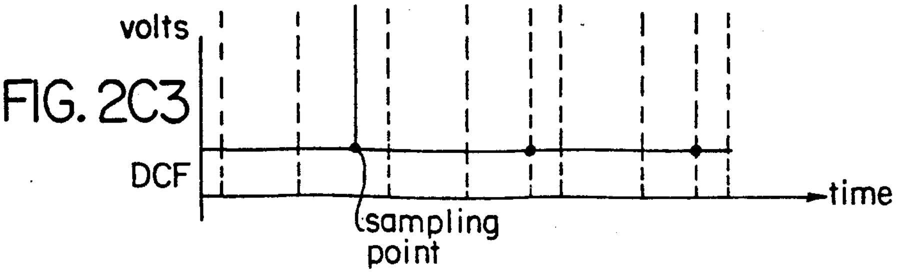
FIG. 2C3

ADAPTIVE DIGITAL ARMATURE CURRENT CONTROL METHOD FOR WARD-LEONARD ELEVATOR DRIVES USING AN SCR GENERATOR FIELD CONVERTER

REFERENCE TO RELATED APPLICATIONS

The invention described herein may employ some of the teachings disclosed and claimed in commonly owned copending applications filed on even date herewith by Herkel et al, U.S. Ser. No. 07/589,860, entitled, "Control of a Discontinuous Current by a Thyristor Rectifier with Discontinuous Load", Horbruegger, et al, U.S. Pat. No. 5,076,399 issued Dec. 31, 1991, entitled "Elevator Start Control Technique for Reduced Start Jerk and Acceleration Overshoot", Ackermann et al, U.S. Ser. No. 07/589,862, entitled "Adjusting Technique for a Digital Elevator Drive System".

TECHNICAL FIELD

This invention relates to an elevator drive system and, particularly, to digital control thereof.

BACKGROUND OF THE INVENTION

A current Iscr of an SCR converter, connected to an inductive load, is discontinuous as long as the average load current is lower than a certain limit. Discontinuity is caused by the ripple of the load current which depends on the shape of the load voltage and the values of the load inductance and resistance.

Discontinuity may be made worse by the special behavior of the thyristors in the converter in switching off below a holding current or latching current. An SCR requires a certain minimum anode current to maintain it in the closed, or conducting, state. If the anode current drops below this minimum level, designated as the holding current, while the gate current is zero, then the SCR reverts to the forward blocking, or open state. A somewhat higher value of anode current than the holding current is required for the SCR to initially pick up. If this higher value of anode latching current is not reached, the SCR will revert to the blocking state as soon as the gate signal is removed. After this initial pickup action, however, the anode may be reduced to the holding current level. For the SCR to trigger, the anode current must be allowed to build up rapidly enough so that the latching current is reached before the triggering pulse is terminated. For highly inductive anode circuits, one must use a maintained trigger which assures gate drive until latching current has been attained.

If, with continuous current, the firing angle is reduced by a small amount, the interval where the generator field voltage Vgf is positive is increased but when the voltage Vgf is negative it is reduced. With current, however, the interval where Vgf is positive is still increasing when the firing angle is reduced, but so is the time where Vgf is negative. Hence, the voltage gain, dVgf/dA, is now much smaller than in the case of continuous current.

Several analog techniques are known for discontinuous current flow adaptation for armature current regulators. An example can be found in at page 124 in "Introduction to the Practice of Transformer and Control Engineering: Regulated Co-Current Flow Actuation", Langhoff, J. and Raatz, E., published by Elitera-Verlag, Berlin (1977). These adaptation schemes are carried out by the structure of the analog regulator being changed with respect to the operating point. This adaptation principle is designed in analog technique which cannot be directly implemented in digital technique and has the general disadvantage of generating amplifier drifts. There is also no special refinement described to adapt the regulator to the special Ward-Leonard drive control as used in an elevator application.

DISCLOSURE OF THE INVENTION

A first object of the present invention is to achieve constant dynamics and steady state behavior of an armature current loop in all operating regions of an SCR converter.

A second object of the present invention is to adapt an armature current regulator to a very nonlinear SCR converter.

A third object of the present invention is to assure good performance of the velocity loop in tracking the reference velocity dictation, especially when leveling the elevator at low speed.

According to the present invention, a discontinuity in the current (Iscr) fed from a silicon controlled rectifier (SCR) converter to a DC generator field is sensed, and the transfer characteristic of an armature current regulator is digitally adapted to the nonlinear characteristics of the SCR generator field converter.

In further accord with the present invention, an On/-Off state monitor detects discontinuity in the output current, Iscr, of the SCR generator field converter. This analog signal is then converted into a digital signal and used to set separately the gain and response of the armature current regulator as functions of the magnitude of the discontinuity. Due to the armature current feedback, the gain of the regulator has a low value, which reduces the requirements for high A/D converter resolution for the armature current feedback. Digital realization of the regulator adaptation both avoids the drift problems that would be encountered in an analog adaptation of the regulator and allows easy changing of parameters through the altering of look-up tables used to change regulator gain and response.

These and other objects, features and advantages of the present invention will become more apparent in light of the following detailed description of a best mode embodiment thereof as illustrated in the accompanying drawing.

BRIEF DESCRIPTION OF THE DRAWING

FIGS. 2A-2C3 show timing diagrams of signals used in the invention for providing a generator field current discontinuity signal.

BEST MODE EMBODIMENT OF THE INVENTION

Figure 1:
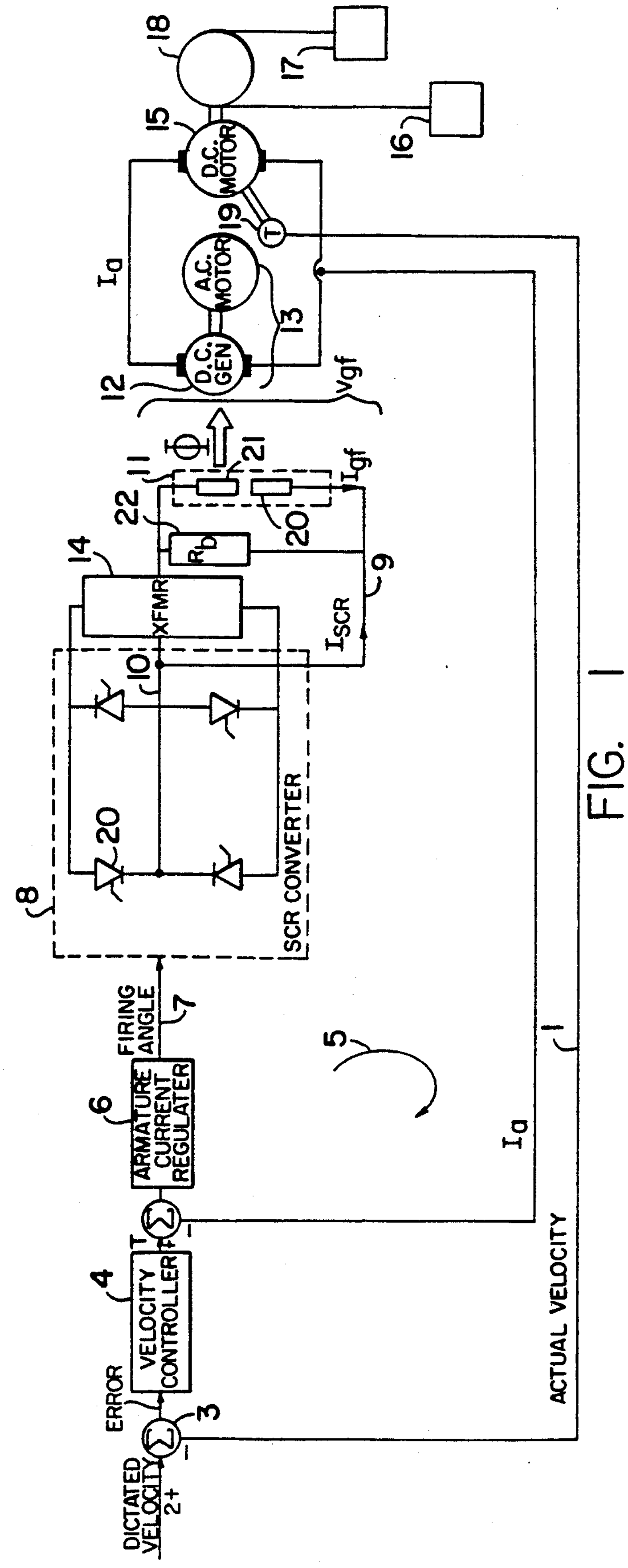
FIG. 1 is a block diagram of a typical Ward-Leonard drive system.

A drive control scheme is shown in FIG. 1. An actual velocity signal on line 1 and a dictated velocity signal on line 2 are brought to a summing junction 3. A velocity controller 4 is responsive to the difference between the magnitudes of the actual velocity signal and the dictated velocity signal and sets an appropriate torque command T signal which is the reference input for the armature current control loop 5. An armature current regulator 6 provides a firing angle A signal on line 7 which activates an SCR converter 8, here used as an actuator, to provide a current Iscr on line 9 through the SCR converter center tap 10, thus setting the output voltage Vgf of the generator field winding 11 of the generator 12 of the MG-set 13. The SCR converter 8 is connected to a power transformer secondary winding 14, part of a typical sinusoidal voltage source (not shown), for receiving a power signal. A DC hoist motor 15 will be activated by the generator armature voltage to produce a torque proportional to the armature current Ia, thereby moving the counterweight 16 and car 17 through rotation of the sheave 18. Actual velocity is fed back to be summed with the dictated velocity by means of a tachometer 19.

The current regulator 6 receives the firing angle signal, at which the thyristors will be fired, as its input signal. The current regulator 6 delivers the armature voltage as its output signal and thus acts as an actuator.

Due to the operation principle of the SCR converter 8 in combination with the high inductive load given by the generator field winding 11, the SCR converter 8 represents a very nonlinear system. The SCR converter characteristics depend on two operation regions according to the continuous or discontinuous current flow in one thyristor pair of the SCR converter 8.

In the continuous operation region, the system gain relates to a cosine function, and the time constant Tgf is given by Tgf=Lgf/Rgf where Lgf 20 and Rgf 21 are the generator field inductance and resistance, respectively. The firing angle in the continuous region is an exemplary 60 degrees. The shaded area of the waveform 22 (FIG. 2) is the generator field voltage Vgf while the entire half sinusoid represents the rectified supply voltage. FIG. 2*a* shows the waveform 22 generator field voltage Vgf and the waveform 23 of the SCR current, Iscr, as it will occur in the continuous operation region.

However, the situation is different for a different firing angle signal such as one used where the elevator speed is small. Here, with an exemplary firing angle of 110 degrees, the DC component of the output voltage of the SCR converter 8 becomes low and Iscr becomes discontinuous, as shown in FIG. 2B, waveform 24. The firing angle, which corresponds to the transition from continuous to discontinuous operation, is a function of SCR current ripple; looking only to the open loop operation of the SCR converter 8, the SCR input voltage will not affect the firing angle which determines the transition from continuous to discontinuous operation. The firing angle, in turn, is a function of the time constant Tgf of the generator field, which itself relates to the type of generator used.

Except for at an extremely low Iscr, the generator field current flow Igf remains continuous (FIG. 2) due to a bypass resistor Rb 25, even though Iscr may become discontinuous. Thus, the overall time constant of the SCR converter 8 depends on the ratio of current impression due to the thyristors and the freewheeling current flow through Rb 25.

The discrete-time operation of the SCR converter 8 represents a dead-time process that can be expressed by an additional time constant that is about one fourth of the line voltage period. With respect to the large generator field time constant (about 0.5 sec), this can be neglected for design of the armature current loop, and thus the actuator model can be defined as a first order system.

During discontinuous current operation, Igf has two components. The first component, while Iscr is zero, is due to the Igf being equal to Iscr minus the current through the bypass resistor Rb 22. Here, the generator field time constant, Tgf1, is equal to Lgf/Rgf. The second component, while Iscr is zero, occurs where Igf is flowing through the bypass resistor Rb 22. Now, the generator field time constant, Tgf2, is equal to Lgf/(Rgf+Rb16). The overall time constant of the current regulator is given by the ratio of Iscr and the freewheeling current flow through Rb 22, i.e., by the length of time of discontinuity. The resulting converter time constant is produced by the interaction of Tgf1 with Tgf2 with respect to discontinuity.

This differentiates the invention from drive systems having a DC motor directly coupled to a thyristor rectifier. In direct coupled systems, the time constant of a current regulator in combination with a motor armature inductance decreases instantaneously to zero, in the discontinuous region, because no freewheeling resistor is in parallel to the armature inductance. In other words, Tgf2, where the armature current is zero, is zero in that the overall time constant of the current regulator also steps to zero.

In addition to the generator field time constant, the larger armature current time constant must be accounted for in compensating for the nonlinearity of the rectifier. The armature time constant does not change as the generator field time constant does because it is the generator field current that is affected by discontinuity, not the armature field current.

Where the control loop is closed far from the SCR converter 8, a poor response is achieved. The advantage of the armature current loop is that the gain of the DC machine is very high because the resistance in the armature is very low and there is a high armature voltage. To close the loop then, a regulator having a gain of one is sufficient, and resolution problems, as well as the need for a high gain regulator, are avoided. Thus, the high gain already existing in the armature loop avoids the need for a high gain regulator and the consequent need for a high resolution A/D converter.

The operation of an SCR converter is such that in combination with a highly inductive load, such as a generator field winding, the actuating SCR converter represents a nonlinear system due to discontinuity in the output current. To achieve constant dynamics and steady state behavior of the armature current loop in all operating regions of the SCR converter, the armature current regulator, a linear system, must be adapted to the nonlinear SCR converter. A digital adaptation scheme is desired because of the ease of changing the system parameters in software and to avoid amplifier drifts.

Figure 3A:
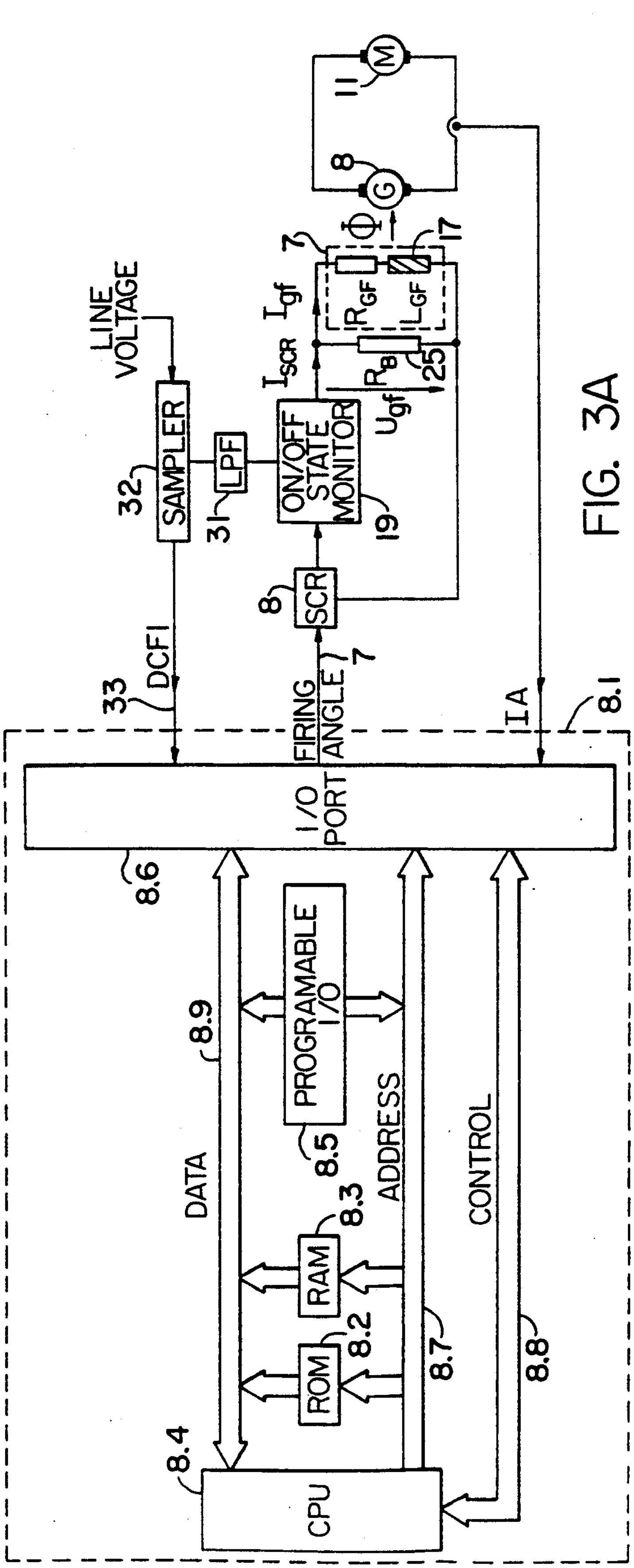
FIGS. 3(A) and 3(B) are alternate block diagrams of a single embodiment of the armature current control loop of the present invention.

FIG. 3A illustrates a signal processor 8.1, which may be any discrete-time or integrated circuit which carries out the functions to be described hereinafter. The signal processor 8.1 contains (RAM) 8.2, read-only-memory (ROM) 8.3, a central processing unit (CPU) 8.4 , a programmable input/output (I/O) unit 8.5, and an I/O port 8.6. In addition, communication between and among said RAM, ROM, CPU, programmable I/O unit, and I/O port is carried out by an address bus 8.7, a control bus 8.8 and a data bus 8.9. Among the outputs from the signal processor 8.1 is the firing angle signal on line 7. Among the inputs to the signal processor are the armature current Ia and a signal DCF1.

Figure 3B:
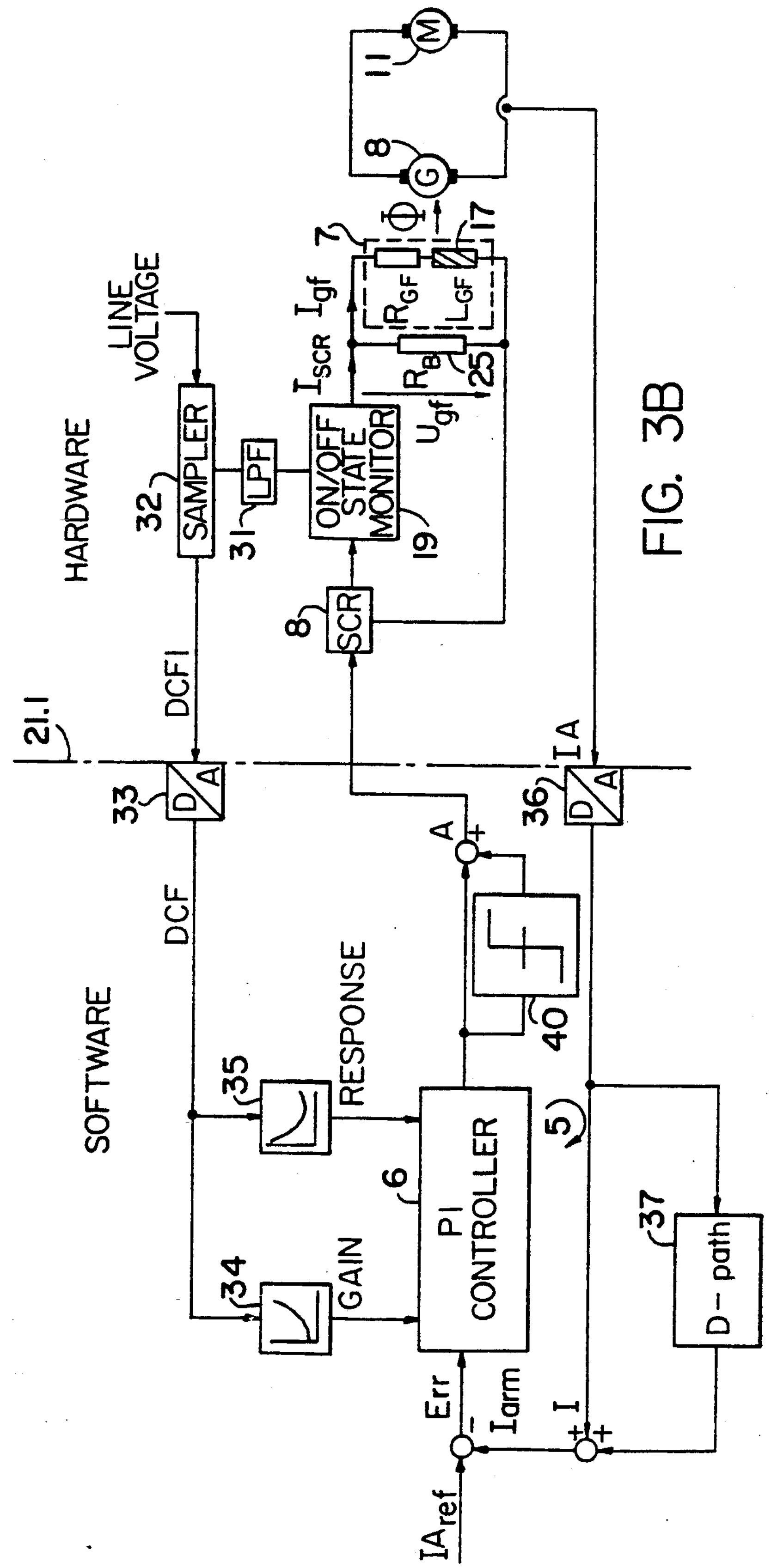

In FIG. 3*b*, a block diagram of the armature current control loop 5 of the present invention, the armature of a dc motor 15 is excited by the generator of the M-G set 13 having a generator field winding 11 represented by the reactive impedance consisting of the generator field resistance 20 and the generator field inductance 21. A dashed line divides the software embodiment of the invention from the hardware portion. The generator field winding 11 is shunted by a resistor Rb 25 which serves to prevent the generator field current Igf from dropping to zero except for when the SCR converter output is extremely low. The SCR converter 8 sets the generator field voltage Vgf applied to the generator field 11 The field current Igf determines the armature voltage, which activates the DC-motor 15.

In order to compensate the gain and response for discontinuities in the SCR converter output current, Iscr, that current must first be ascertained. The control characteristic of the generator field converter 8 at discontinuous current is a function of the SCR converter on-state/off-state time ratio.

An On/Off State Monitor 26 (FIGS. 3A, 3B and 4) is responsive to the SCR converter output current on line 9 and provides a Discontinuous Current Flow signal DCF1 of the Iscr current, indicating zero Iscr. The on/off ratio, or duty cycle, indicates the intensity, in time, of discontinuous current, and the discontinuity is used to determine the actual operating point of the control loop. High discontinuity indicates reduced gain in the SCR converter 8.

Figure 4:
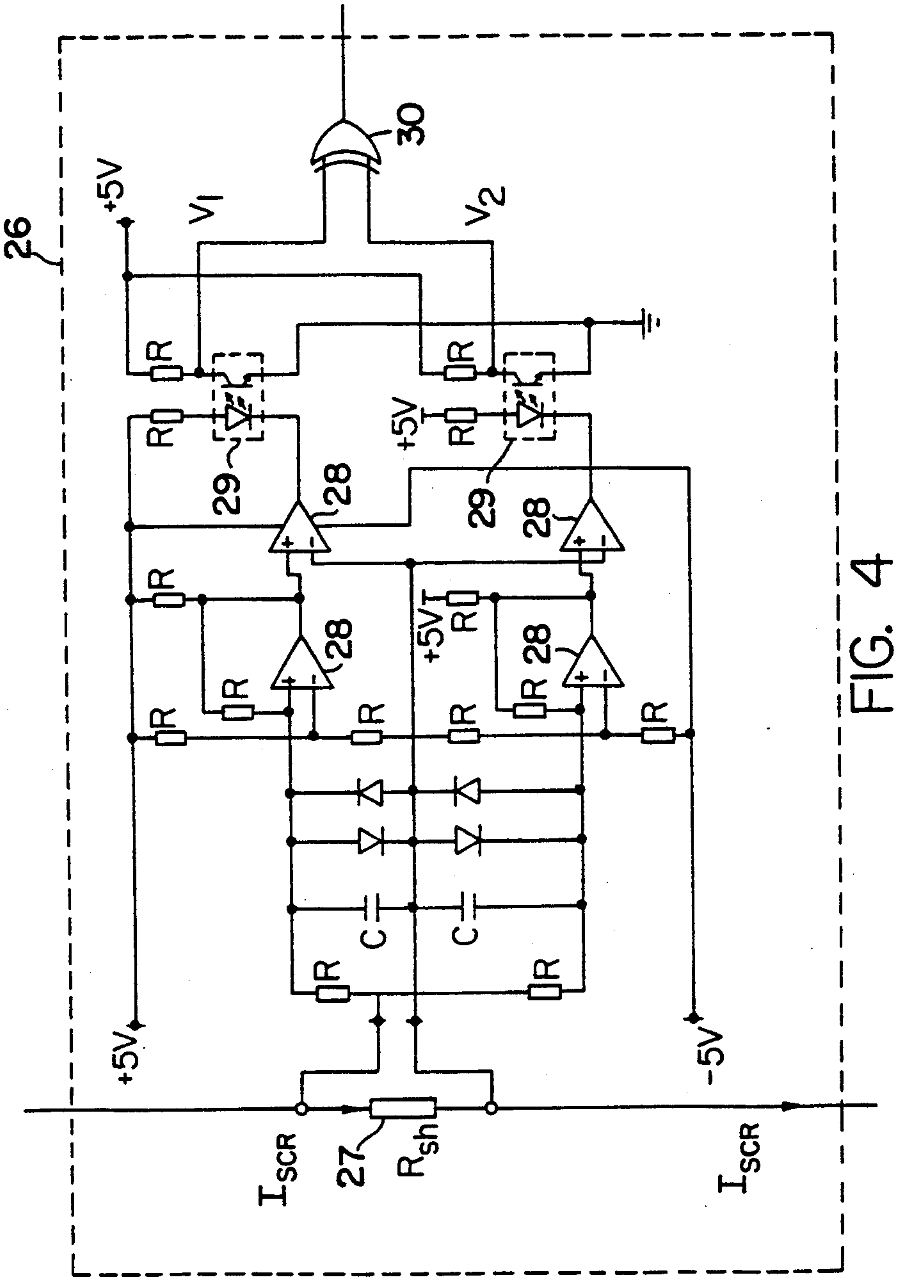
FIG. 4 is a schematic of the on-off state monitor.
Figure 6:
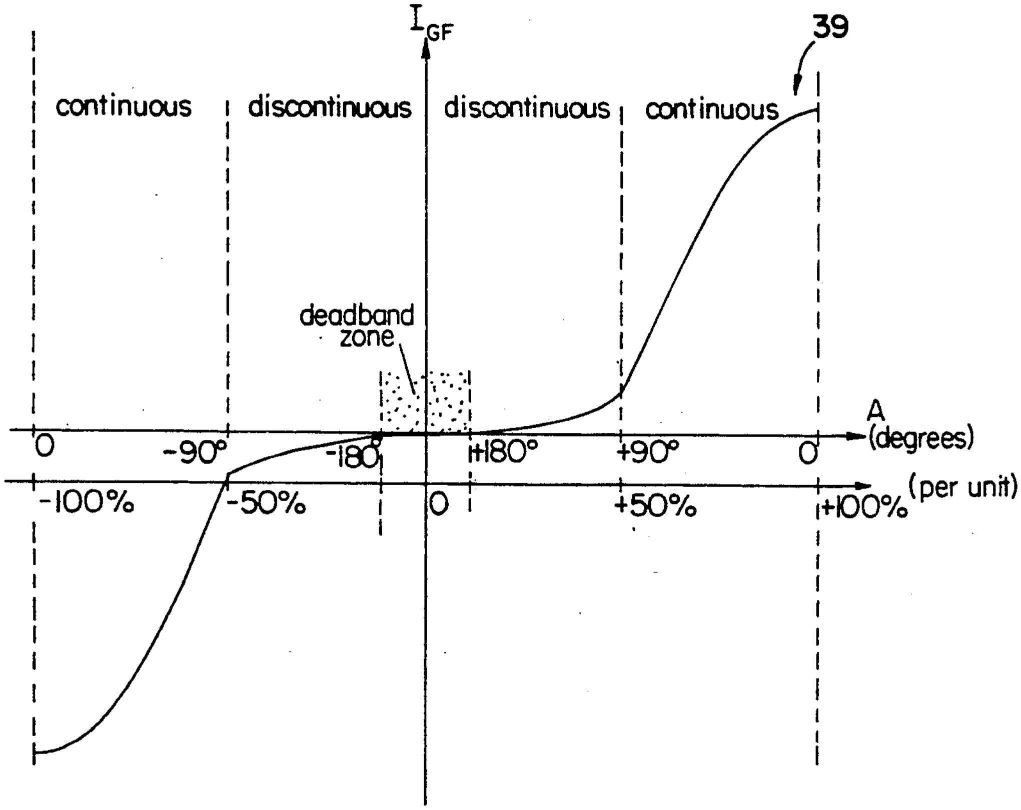
FIG. 6 shows the steady-state relationship of generator field current versus converter firing angle.

FIG. 4 shows the on/off state monitor 26. Iscr is measured by a shunt resistor Rsh 27 (FIG. 4) which receives the current from the center tap 10 of the SCR converter 8, and the off state is detected by four comparators 28 that change their output states depending on the shunt resistor voltage. Two logic signals V1 and V2 are sent to optically coupled isolators 29. While Iscr is flowing, V1 and V2 are equal. Discontinuity, indicated by Iscr being zero, is indicated when V1 and V2 are not equal. V1 and V2 are then provided to a logical XOR 30, and the output signal is of the shape of a pulse width modulation signal. The signal is logic level high if Iscr is not flowing and logic level low if Iscr is flowing (FIG. 2C1). By low pass filtering 31, the signal is transformed to a DC level, which has an AC component (FIG. 2C2) due to the small time constant of the filter used to achieve fast response, as needed in case of dynamic changes of the firing angle. The DC level gives information about the magnitude, in time, of the discontinuous current flow. The signal DCF1 is sampled 32 in synchronization with the line voltage supplied to the transformer 14. Thus, the ripple content in DCF1 is not transferred as shown in FIG. 2C3. From there, DCF1 is provided to an A/D converter 33. The DCF signal is a digital signal, in the preferred embodiment, an 8-bit signal. A value of 255 in the eight-bit signal is 100% discontinuity while a value of 0 is 0% discontinuity. The output of the A/D converter 33 is provided to a gain compensation function generator 34 and response compensation function generator 35. The current is also read by an A-D converter 36 so that the armature current can be summed with the dictated armature current Iref. For stabilization purposes, a differentiation path 37 (D-path block) is added in the feedback path of the armature current control loop 5 to increase the system response. The actual SCR converter time constant depends on the intensity of discontinuity, i.e., there exists a monotone functional relationship between the discontinuity and the DCF signal. The reason for this is the bypass resistor Rb 25. See FIGS. 2B, 1, 6.

The current regulator parameters are adapted to the nonlinear SCR converter 8 behavior by setting gain and response separately as functions of the magnitude, in time, of the discontinuous SCR converter current flow, indicated by the DCF signal.

Figure 5A:
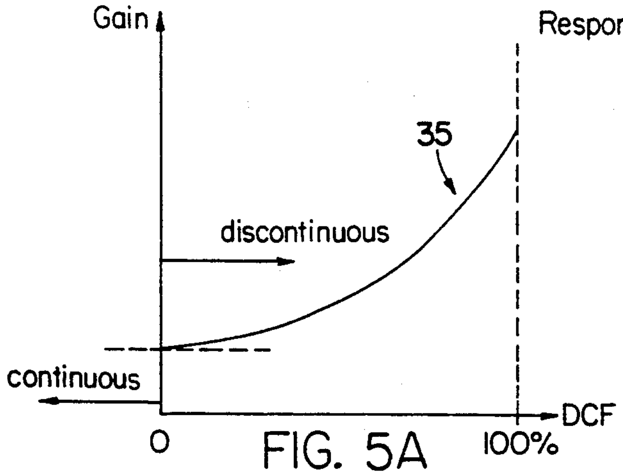
FIGS. 5A and 5B are graphs of gain and response, respectively, as functions of the magnitude of SCR converter output current discontinuity.
Figure 5B:
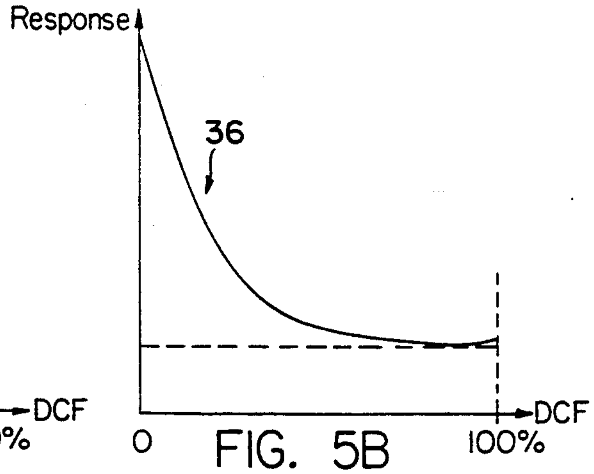

The discontinuous current flow signal DCF, now digitalized, is provided to the gain function generator 33 in a typical microprocessor system (not shown). The gain function generator 34 receives the DCF signal and provides an output signal that varies depending upon the magnitude, in time, of the Iscr discontinuity as shown by the graph in block 33. The curve 38 of FIG. 5A represents the gain required to compensate for Iscr discontinuity caused by the nonlinearity in the SCR converter characteristic. When Iscr is highly discontinuous, a large gain is required to compensate. When Iscr discontinuity is low, little gain compensation is needed. The curve of FIG. 5A, the characteristic of the function generator, ay be varied by means of lookup tables to account for different characteristics of different generator fields. In the preferred embodiment, the lookup table values are a function of the physical behavior of the SCR converter 8 and the armature current regulator 6 together with the generator field winding 11. Other factors might cause a change in the lookup tables and therefore in the function generator characteristic. For example, if the resistor Rb 25 (FIG. 3B) were not used, a different function generator characteristic would be substituted. Every change in dynamic response and static gain can be changed by changing the look up table. The compensation of response for SCR converter current discontinuity is similar. A second function generator 34 with a different characteristic 36 (FIG. 5B), is used.

Gain is increased for a large discontinuity and decreased for a low discontinuity. Response compensation is high for low discontinuity, but low for high discontinuity. Digital adaptation of the current regulator 6 is another significant advantage of the claimed invention because it eliminates the problem of amplifier drifts found in analog regulator adaptation systems.

The armature current error signal Err is the input of the adaptive regulator 6. A proportional integral (PI) controller is used for the regulator 6. The gain and response compensation signals are provided to the PI controller. A PI structure with the following frequency response is used:

$$Gr(s) = \frac{K * (1 + sT)}{sT} = K + \frac{K}{sT}$$

where

K: gain

T: response s: LaPlace operator

Digital implementation is done using the following algorithm:

$$U(k)=U(k-1)+Q0*E(k)-Q1*E(k-1)$$

U(k)=regulator output at time instant k*T0
E(k)=control error at time instant k*T0
$U(k-1)$=regulator output at previous time instant k*T0
$E(k-1)$=control error at previous time instant k*T0
Q0=Gain
$Q1$=Gain * (1−T0/Response)
T0=sampling time FIG. 2 shows the steady state relationship of the related generator field current Igf versus the firing angle A of an SCR converter. In the discontinuous operation region, the gain and the time constant of the SCR converter in combination with the generator field inductance, decrease to zero. The actual time constant and gain depend on the operating point, i.e. the point along the curve t which the stem is operating.

As shown in FIG. 2, at very low levels of the generator field current, the gain of the SCR converter decreases to zero with the result that even with large changes in firing angle, the generator field current, Igf, does not change significantly. This, too, occurs in the discontinuous region. Because of the low gain, a switching regulator, rather than a linear regulator, is required to control Igf at low values. The control system has to compensate for this dead band in case of a zero crossing of the firing angle A which relates to the physical firing angle in the range of 150° to 180° and −180° to −150° degrees. To compensate for this merely by changing the regulator gain, as was done to compensate for Iscr discontinuity, would require increasing the gain of the regulator to infinity. Thus, the lookup tables used to compensate for Iscr discontinuity are unable to also compensate for the dead band case. The compensation, therefore, is done by adding or subtracting an offset value of, for example 60 degrees, to the regulator output firing angle, to come out of the dead band zone (FIG. 6) by block 40 (FIG. 3B).

Figure 7:
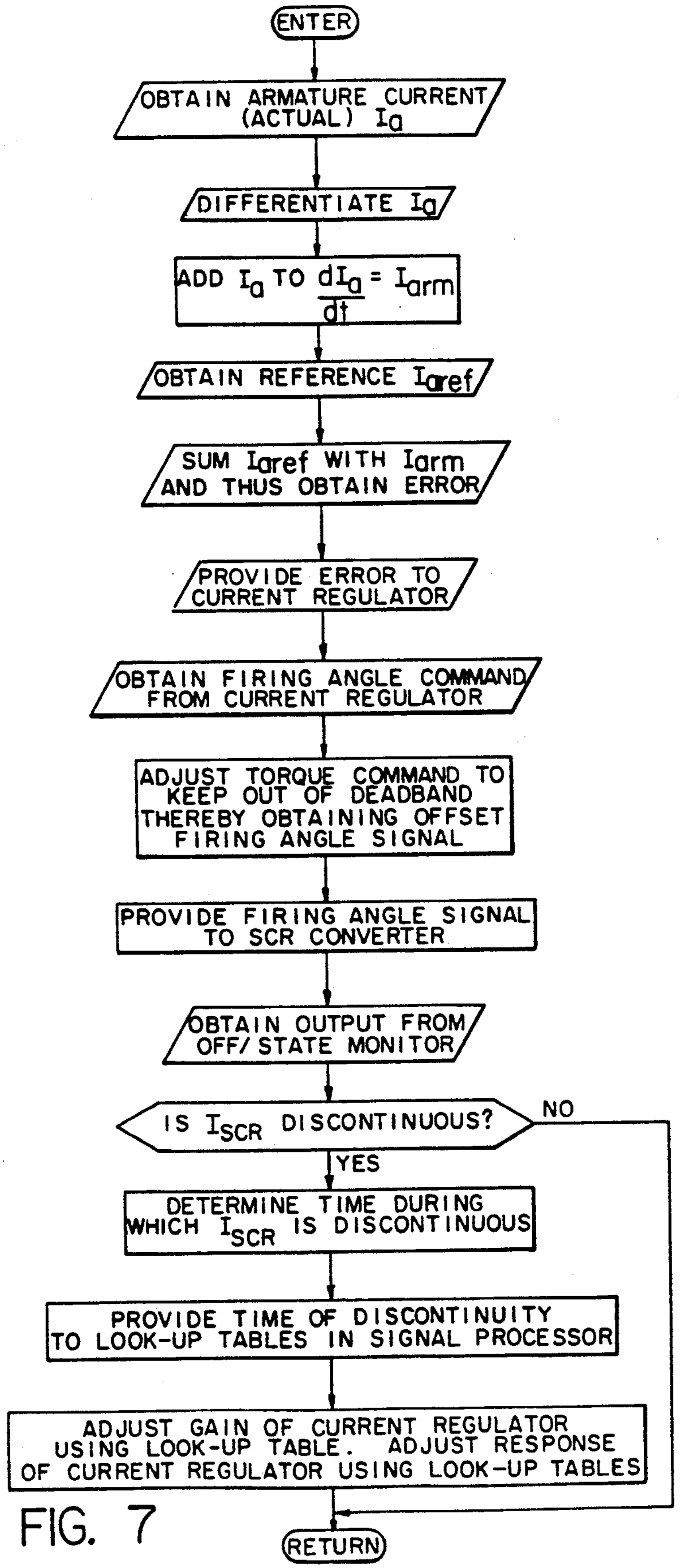
FIG. 7 shows a flow chart of the invention.

The software embodiment of the invention is shown in FIG. 7. After entering at a step 41, the actual dc motor armature current is obtained, step 42. This value is differentiated with respect to time 1 step 43, and added to the actual value in step 44. The result Iarm, in step 44, of the summation is added to a dictated or reference armature current Iref. The reference armature current Iaref, obtained in step 45, is summed, step 45, with Iarm and an error provided to the current regulator 6 in step 47. The current regulator, 6 which may be of the proportional integral variety provides a firing angle command, which command determines at what angle of the supply voltage the thyristors will fire, in step 48. In step 49, a positive or negative offset value is added to the firing angle command to prevent Igf from entering a dead band zone wherein Igf becomes zero. The firing angle signal, in step 50, is provided to the SCR converter 8 for firing the silicon controlled rectifiers therein at a given angle of the supply voltage. In step 51, the SCR output current, Iscr, is obtained. If Iscr is not discontinuous, (step 52 no) then the digital adaptation method of the present invention is ended until the next iteration of the process. If, on the other hand, Iscr is discontinuous, (step 52 yes) the length of time of the discontinuity must be determined, which time value is obtained in step 53. Lookup tables in RAM of the signal processor produce selected gain and response adjustment values for given discontinuity times in step 54. The gain and response of the current regulator are adjusted for the discontinuity in step 55. A return to the beginning of the method here is made in step 56. The result is that a Ward-Leonard elevator drive may use an armature control current loop.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. In an elevator drive, a method for controlling a current regulator, said current regulator for controlling a rectifier, said rectifier for providing a current to an inductive load, comprising the steps of:

measuring the magnitude of said current at a value equal or below a selected magnitude for providing an analog discontinuous current signal indicative of the time that said current is at or below said selected magnitude;

providing a digital discontinuous current signal in response to said analog discontinuous current signal; and continuously digitally adapting the gain of said current regulator to increment said gain when said digital discontinuous current signal increases and decrement said gain as said digital discontinuous current signal decreases.

2. In an elevator drive, a method for controlling a current regulator, said current regulator being available for controlling a rectifier, said rectifier providing a current to an inductive load, comprising the steps of:

measuring the time during which the magnitude of said current is at a value equal or below a selected magnitude for providing an analog discontinuous current signal indicative of the time that said current is at or below said selected magnitude;

providing a digital discontinuous current signal in response to said analog current signal; and continuously digitally adapting the time constant of said regulator to increment said time constant when said digital discontinuous current signal increases and decrement said time constant as said digital discontinuous current signal decreases.

3. An apparatus for controlling a current regulator for use in an elevator drive, said current regulator for controlling a rectifier, said rectifier for providing a current to an inductive load, comprising:

measuring means, responsive to said current, for measuring the magnitude of said current at a value equal or below a selected magnitude for providing an analog discontinuous current signal indicative of the time that said current is at or below said selected magnitude;

analog to digital conversion means, responsive to said analog discontinuous current signal, for providing a digital discontinuous current signal;

gain varying means, responsive to said digital discontinuous current signal, for continually incrementing the gain of said current regulator as said digital discontinuous current signal increases and for decrementing said gain of said current regulator as said digital discontinuous current signal decreases.

4. An apparatus for controlling a current regulator in an elevator drive, said current regulator for controlling a rectifier, said rectifier for providing a current to an inductive load comprising:

measuring means, responsive to said current, for measuring the magnitude of said current at a value equal or below a selected magnitude and for providing an analog discontinuous current signal indicative of the time that said current is at or below said selected magnitude;

analog to digital conversion means, responsive to said analog discontinuous current signal, for providing a digital discontinuous current signal; and time constant varying means, responsive to said digital discontinuous current signal, for continually incrementing the time constant of said current regulator as said digital discontinuous current signal increases and for decrementing the time constant of said current regulator as said digital discontinuous current signal decreases.

5. In an elevator drive, a method for controlling a current regulator, said current regulator for controlling a rectifier, said rectifier for providing a current to an inductive load, comprising the steps of:

measuring an armature current;

differentiating said armature current and obtaining a derivative;

adding said armature current to said derivative for obtaining a sum;

obtaining a reference armature current;

adding said reference armature current to said sum for obtaining an error signal;

providing said error signal to said current regulator;

providing a firing angle command from said current regulator to said rectifier;

measuring the magnitude of said current at a value equal or below a selected magnitude for providing an analog discontinuous current signal indicative of the length of time that said current is at or below said selected magnitude;

providing a digital discontinuous current signal in response to said analog discontinuous current signal; and continuously digitally adapting the gain of said current regulator to increment said gain when said digital discontinuous current signal increases and decrement said gain as said digital discontinuous current signal decreases.

6. In an elevator drive, a method for controlling a current regulator, said current regulator for controlling a rectifier, said rectifier for providing a current to an inductive load, comprising the steps of:

measuring an armature current;

differentiating said armature current and obtaining a derivative;

adding said armature current to said derivative for obtaining a sum;

obtaining a reference armature current;

adding said reference armature current to said sum for obtaining an error signal;

providing said error signal to said current regulator;

providing a firing angle command from said current regulator to said rectifier;

measuring the magnitude of said current at a value equal or below a selected magnitude for providing an analog discontinuous current signal indicative of the length of time that said current is at or below said selected magnitude;

providing a digital discontinuous current signal in response to said analog discontinuous current signal; and continuously digitally adapting the time constant of said current regulator to increment said time constant when said digital discontinuous current signal increases and decrement said time constant as said digital discontinuous current signal decreases.

7. In an elevator drive, an apparatus for controlling a current regulator, said current regulator for controlling a rectifier, said rectifier for providing a current to an inductive load, comprising:

means for measuring an armature current;

means for differentiating said armature current and obtaining a derivative;

means for adding said armature current to said derivative for obtaining a sum;

means for obtaining a reference armature current;

means for adding said reference armature current to said sum for obtaining an error signal;

means for providing said error signal to said current regulator;

means for providing a firing angle command from said current regulator to said rectifier;

means for measuring the magnitude of said current at a value equal or below a selected magnitude for providing an analog discontinuous current signal indicative of the length of time that said current is at or below said selected magnitude;

means for providing a digital discontinuous current signal in response to said analog discontinuous current signal; and gain varying means, responsive to said digital discontinuous current signal, for continually incrementing the gain of said current regulator as said digital discontinuous current signal increases and for decrementing said gain of said current regulator as said digital discontinuous current signal decreases.

8. In an elevator drive, an apparatus for controlling a current regulator, said current regulator for controlling a rectifier, said rectifier for providing a current to an inductive load, comprising:

means for measuring an armature current;

means for differentiating said armature current and obtaining a derivative;

means for adding said armature current to said derivative for obtaining a sum;

means for obtaining a reference armature current;

means for adding said reference armature current to said sum for obtaining an error signal;

means for providing said error signal to said current regulator;

means for providing a firing angle command from said current regulator to said rectifier;

means for measuring the magnitude of said current at a value equal or below a selected magnitude for providing an analog discontinuous current signal indicative of the length of time that said current is at or below said selected magnitude;

means for providing a digital discontinuous current signal in response to said analog discontinuous current signal; and time constant varying means, responsive to said digital discontinuous current signal, for continually incrementing the time constant of said current regulator as said digital discontinuous current signal decreases and for decrementing the time constant of said current regulator as said digital discontinuous current signal increases.

* * * * *